US010319201B2

(12) United States Patent
Zhao

(10) Patent No.: US 10,319,201 B2
(45) Date of Patent: Jun. 11, 2019

(54) SYSTEMS AND METHODS FOR HIERARCHICAL ACOUSTIC DETECTION OF SECURITY THREATS

(71) Applicant: Shanghai Xiaoyi Technology Co., Ltd., Shanghai (CN)

(72) Inventor: Lili Zhao, Shanghai (CN)

(73) Assignee: Shanghai Xiaoyi Technology Co., Ltd., Shanghai (CN)

( * ) Notice: Subject to any disclaimer, the term of this patent is extended or adjusted under 35 U.S.C. 154(b) by 46 days.

(21) Appl. No.: 15/626,370

(22) Filed: Jun. 19, 2017

(65) Prior Publication Data

US 2018/0089970 A1 Mar. 29, 2018

(30) Foreign Application Priority Data

Sep. 26, 2016 (CN) .......................... 2016 1 0853212

(51) Int. Cl.
*G06F 17/00* (2019.01)
*H04R 29/00* (2006.01)
*G08B 13/16* (2006.01)
*G08B 13/04* (2006.01)

(52) U.S. Cl.
CPC .......... *G08B 13/1672* (2013.01); *G08B 13/04* (2013.01); *H04R 29/00* (2013.01)

(58) Field of Classification Search
CPC .. G08B 13/1672; G08B 13/04; G08B 29/185; H04R 29/00; H04R 29/004; H04R 29/005; G06F 17/3074; G06F 17/30743
USPC ........ 700/94; 340/541, 545.1, 545.2; 381/56
See application file for complete search history.

(56) References Cited

U.S. PATENT DOCUMENTS 7,659,814 B2 * 2/2010 Chen ...................... G08B 25/08 340/531
7,680,283 B2 * 3/2010 Eskildsen .......... G08B 13/1672 340/541
8,665,084 B2 * 3/2014 Shapiro .................... G08B 3/10 340/506

(Continued)

FOREIGN PATENT DOCUMENTS

CN 104112324 A 10/2014
CN 104408850 A 3/2015

(Continued)

*Primary Examiner* — Xu Mei
(74) *Attorney, Agent, or Firm* — Finnegan, Henderson, Farabow, Garrett & Dunner, LLP

(57) ABSTRACT

Systems and methods for detecting a security threat over a network are provided. The system comprises a microphone configured to capture acoustic signals; a hardware interface configured to generate data samples from the acoustic signals; a memory storing a plurality of instructions; and a hardware processor configured to execute the instructions to: determine information indicative of a rate of intensity variation of the acoustic signals; and determine, based on the information, whether to transmit the data samples to a remote server. The hardware processor is also configured to, after determining to transmit the data samples to the remote server, generate data packets that include the data samples, and transmit the data packets to the remote server. The remote server can then reconstruct the data samples from the data packets and, if the data samples indicates a security threat, transmit a warning signal to a monitoring device.

13 Claims, 5 Drawing Sheets

(56) References Cited

U.S. PATENT DOCUMENTS

| | | | |
|---|---|---|---|
| 9,594,163 B2 | 3/2017 | Park et al. | |
| 2008/0018461 A1 | 1/2008 | Reymond | |
| 2010/0283607 A1* | 11/2010 | Smith | G08B 13/04 340/541 |
| 2011/0158417 A1* | 6/2011 | Lin | G01S 3/8006 381/56 |
| 2011/0313555 A1* | 12/2011 | Shoham | G10L 25/48 700/94 |
| 2014/0307096 A1 | 10/2014 | Park et al. | |
| 2015/0194036 A1* | 7/2015 | Zhevelev | G08B 21/18 340/540 |

FOREIGN PATENT DOCUMENTS

| | | |
|---|---|---|
| CN | 104952186 A | 9/2015 |
| JP | H10283577 A | 10/1998 |

* cited by examiner

SYSTEMS AND METHODS FOR HIERARCHICAL ACOUSTIC DETECTION OF SECURITY THREATS

CROSS-REFERENCE TO RELATED APPLICATION

This application is based upon and claims priority from Chinese Patent Application No. 201610853212.3, filed on Sep. 26, 2016, the disclosure of which is expressly incorporated herein by reference in its entirety.

TECHNICAL FIELD

This disclosure generally relates to security technology, and more specifically relates to systems and methods for hierarchical acoustic detection of security threats.

BACKGROUND

Security systems typically collect data of the environment, analyze the data to detect a security threat, and then perform an action (e.g., generate an alarm) when a security threat is detected. For example, a home security system may include one or more cameras to collect images of different areas of a house (e.g., at the front door, at the windows, etc.). When an intruder breaks into the house, the intruder's action can be captured by the cameras. The images can then be transmitted to a processing center, where the images can be analyzed to determine that an intrusion has taken place. The images can be analyzed by human beings, by computers (e.g., by running a software program that compares the images against certain image patterns that are representative of intrusion), or by a combination of both. After determining that an intrusion has taken place, the processing center can then take certain measures, such as notifying the law enforcement, the home owner, etc., about the intrusion.

Besides image-based detection, security threats can also be detected based on acoustic signals (e.g., sound). For example, a rapid change in the intensity of acoustic signals collected from the interiors of a house may also indicate that an event that poses a security threat (e.g., a home intrusion) has occurred. For example, acoustic signals associated with various actions indicative of security threats, such as screaming, yelling, breaking of things, etc., typically include rapid change in the intensity. Therefore, a home security system may also detect security threats by detecting rapid change in the intensity of the acoustic signals collected from the interior of the house.

Compared with image-based detection, acoustics-based detection provides a number of advantages. For example, in a case where a home security system provides 24-hour non-stop monitoring, the capturing of acoustic signals can be less intrusive to occupants of the home than the capturing of images. Moreover, acoustic signals typically require less network bandwidth and computation resources for transmission and processing than image data. Therefore, acoustics-based detection has become an important component of home security systems, where network bandwidth and computation resources are typically more limited.

However, an acoustic-based detection system can still consume considerable amount of network bandwidth and computation resources, if the system transmits all of the collected sound data, continuously and indiscriminately, to the processing center.

SUMMARY

Consistent with embodiments of this disclosure, there is provided a system for detecting a security threat over a network. The system comprises a microphone configured to capture acoustic signals, a hardware interface configured to generate data samples from the acoustic signals, a memory storing a plurality of instructions; and a hardware processor configured to execute the instructions to: determine information indicative of a rate of intensity variation of the acoustic signals; determine, based on the information, whether to transmit the data samples to a remote server; after determining to transmit the data samples to the remote server: generate data packets that include the data samples, and transmit the data packets to the remote server to enable the remote server to perform further analysis on the data packets to determine a security threat.

Consistent with embodiments of this disclosure, a method for detecting a security threat over a network is provided. The method comprises: receiving acoustic signals; generating data samples from the acoustic signals; determining information indicative of a rate of intensity variation of the acoustic signals; determining, based on the information, whether to transmit the data samples to a remote server; after determining to transmit the data samples to the remote server: generating data packets that include the data samples, and transmitting the data packets to the remote server to enable the remote server to perform further analysis on the data packets to determine a security threat.

Consistent with other disclosed embodiments, a non-transitory computer readable medium is further provided. The non-transitory computer readable medium stores a set of instructions that is executable by a hardware processor to cause the hardware processor to perform any of the methods described herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. The same reference numbers are used throughout the drawings to refer to the same or like parts.

Consistent with embodiments of this disclosure, there is provided a system for detecting a security threat over a network. The system comprises a microphone configured to capture acoustic signals, a hardware interface configured to generate data samples from the acoustic signals, a memory storing a plurality of instructions; and a hardware processor configured to execute the instructions to: determine information indicative of a rate of intensity variation of the acoustic signals; determine, based on the information, whether to transmit the data samples to a remote server; after determining to transmit the data samples to the remote server: generate data packets that include the data samples, and transmit the data packets to the remote server to enable the remote server to perform further analysis on the data packets to determine a security threat.

With embodiments of the present disclosure, a hierarchal acoustic detection system can collect samples of acoustic signals, and prescreen the samples for an indication of a potential security threat. The indication can be based on a rate of variation of the intensity of the acoustic signal. If the system determines that the samples indicate a potential security threat, the acoustic detection system can transmit the acoustic signals to a remote server for further analysis for security threat detection. After receiving the data, the remote server can compare the acoustic signal data against one or more known patterns of acoustic signals that are associated with a security threat. If the remote server detects an indication of a security threat based on a result of the comparison, the system can transmit a message to a client device, which can then display information about the security threat to a user.

With such an arrangement, only a subset of the acoustic signals need to be transmitted to the remote server for security threat analysis. Therefore, the detection of security threat can be performed more efficiently with less network bandwidth and computation resources.

Figure 1:
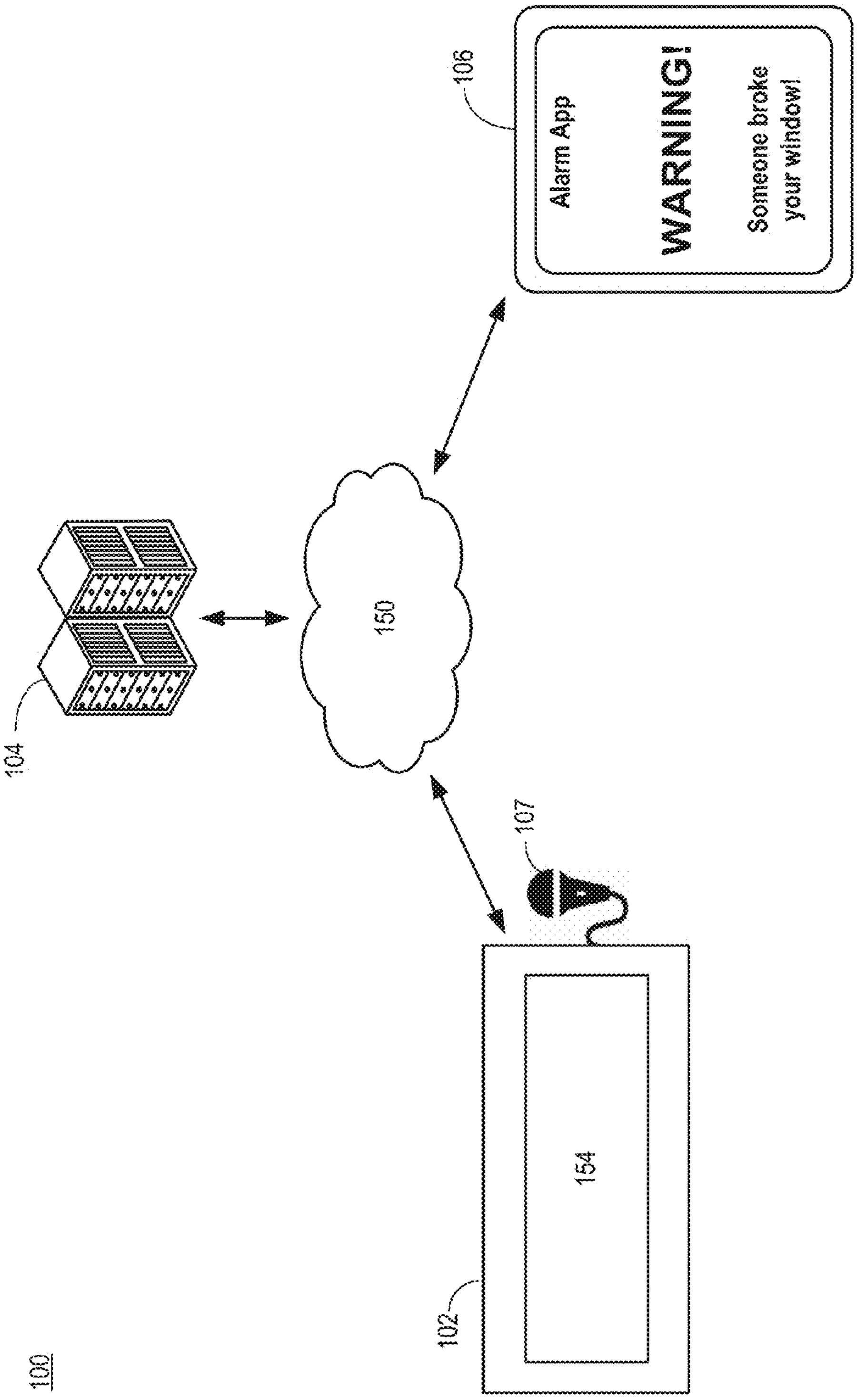
FIG. 1 is an exemplary system for providing hierarchical acoustic detection of security threats, consistent with disclosed embodiments.

FIG. 1 is a block diagram illustrating an exemplary security system 100 for providing hierarchical acoustic detection of security threats, consistent with disclosed embodiments. As shown in FIG. 1, security system 100 includes an acoustic detection system 102, a remote server 104, and a mobile device 106, such as a smartphone.

In some embodiments, acoustic detection system 102 can collect data samples of acoustic signals, and determine a rate of intensity variation of the acoustic signals based on the data samples. As discussed above, a rapid change in the intensity of the acoustic signals may be indicative of a security threat, such as breaking glass. If the rate of intensity change of the acoustic signals exceeds a certain threshold, acoustic detection system 102 may determine to transmit the data samples, over network 150, to remote server 104 for further analysis for security threat detection. Acoustic detection system 102 may also perform additional processing. For example, acoustic detection system 102 may perform noise reduction on the acoustic signals, such as applying linear or time-frequency filters to remove various noise components (e.g., random noise) from the acoustic signals. Further, after acoustic detection system 102 determines which acoustic signals to be transmitted, the system can also transcode the selected acoustic signals data samples using various codecs (e.g., to perform audio compression), generate data packets including the transcoded data samples as data payload, and transmit the data packets to remote server 104.

After receiving the data packets, remote server 104 can retrieve the data payload from the data packets, and decode the data payload to reconstruct the acoustic data samples. Remote server 104 can compare the data samples against one or more known patterns of acoustic signals to detect an indication of a security threat. For example, remote server 104 can compare the data samples against acoustic signal patterns associated with breaking of glass, an item colliding with the floor, human screaming, gun shot, explosion, or any other acoustic patterns associated with a security threat. Remote server 104 can then determine whether the acoustic data samples indicate a security threat based on the comparison result.

In some embodiments, remote server 104 can run one or more learning algorithms, such as a support vector machine, to calibrate and refine the comparison. A support vector machine can analyze data used for classification and regression analysis and then build a model that assigns new examples to different categories according to the analysis result. For example, based on a set of training examples of different events, remote server 104 can create and update an acoustic signals pattern model that provide a representation of acoustic signals of different events as points in space. Remote server 104 can then apply the model to any incoming acoustic signals by mapping them to the points in space represented by the model, to determine an event associated with the acoustic signals. Based on the determined event, remote server 104 can then determine whether the acoustic signals indicate a security threat. After determining that the acoustic signals indicate a security threat, remote server 104 can transmit a signal to mobile device 106 via network 150. In some embodiments, remote server 104 can transmit different signals based on the determined events. For example, if remote server 104 determines that the acoustic signals indicate that a window glass has been broken, remote server 104 can transmit a signal that indicates that someone has broken a window.

In some embodiments, mobile device 106 can be, for example, a tablet, smartphone, a laptop, etc., and includes a communication interface configured to receive the signal from remote server 104 via network 150. In some embodiments, mobile 106 can be installed with an alarm application ("app"), which can display a message based on the signal received. For example, as shown in FIG. 1, if mobile device 106 receives a signal that indicates that someone has broken a window, the alarm app can display a message that corresponds to the signal. The alarm app may also generate prompts in other forms, such as alarm sounds (via the speaker of the mobile device), a vibration (via the vibration motors of the mobile device), etc.

In some embodiments, acoustic detection system 102 may include at least a microphone 107 configured to receive acoustic signals (e.g., audible sound), and generate electrical signals based on the received acoustic signals. Acoustic detection system 102 may also include one or more interface circuits, such as analog-to-digital converter (ADC) circuits, to generate digitized samples of the electrical signals output by microphone 107.

In some embodiments, acoustic detection system 102 can include an acoustic signal processing module 154 configured to process the digitized samples, to determine a rate of intensity variation of the acoustic signals. In some embodiments, acoustic detection system 102 includes one or more computer systems configured to execute a set of software instructions, and acoustic signal processing module 154 can be part of the software instructions. In some embodiments, acoustic signal processing module 154 can also be implemented as one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components.

As discussed above, a rapid change in the intensity of the acoustic signals may indicate that an event that poses a security threat has occurred. Therefore, acoustic detection system 102 can determine a rate of intensity variation of the acoustic signals, and determine whether the rate of intensity variation indicates a potential security threat.

Figure 2:
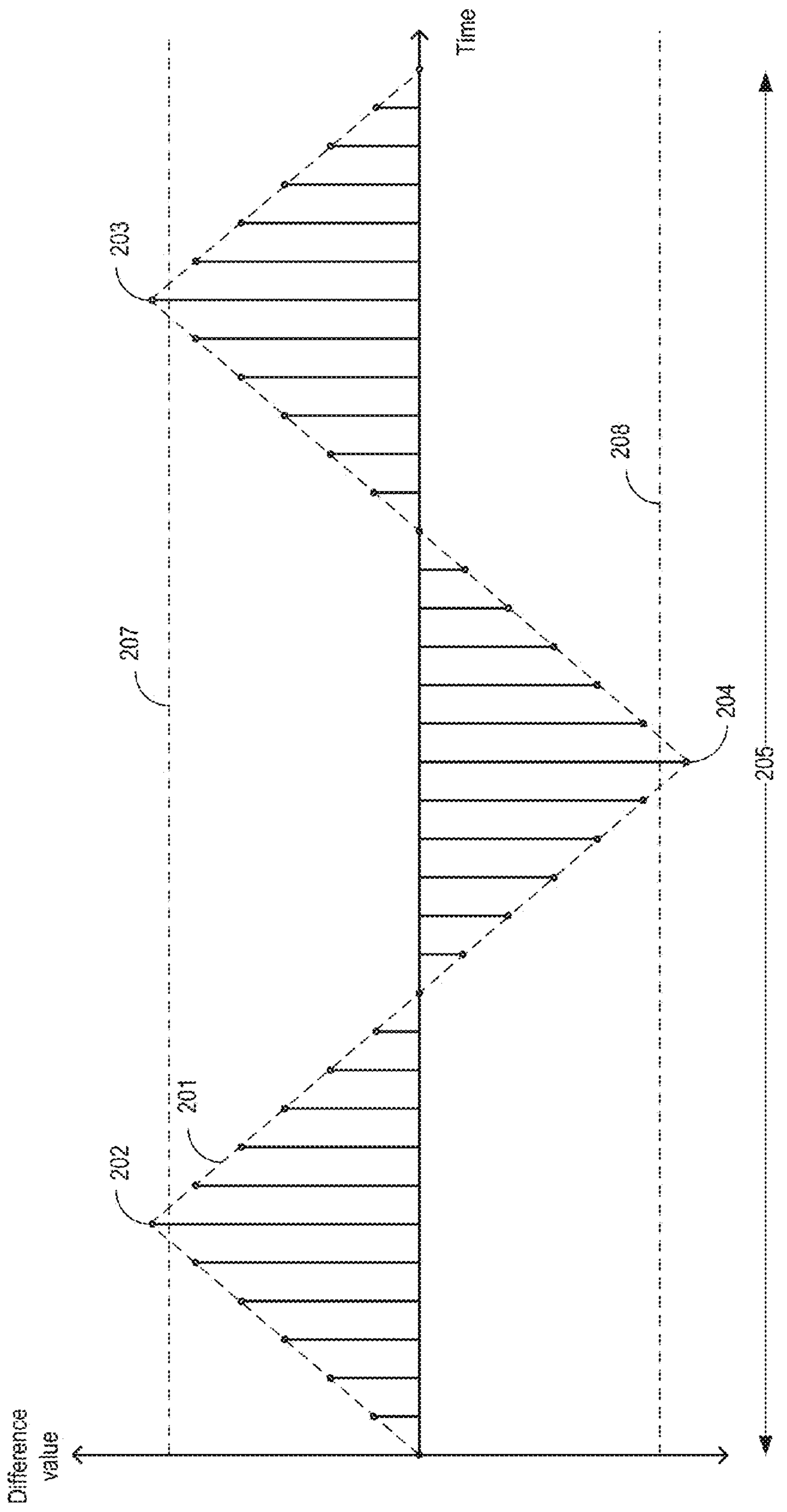
FIGS. 2 and 3 are diagrams illustrating exemplary data for hierarchical acoustic detection of security threats, consistent with disclosed embodiments.

Reference is now made to FIG. 2, which illustrates exemplary data samples of the electrical signals output by microphone 107. Each sample of the electrical signals can represent a difference value between a reference and a magnitude of the intensity of the acoustic signals at a specific time point. A positive difference value may indicate that the magnitude of the intensity exceeds the reference, and a negative different value may indicate that the magnitude of the intensity falls below the reference. As the intensity of the electrical signals (as well as the intensity of the acoustic signals) varies with time, the difference values can also vary with time.

As shown in FIG. 2, the variation in the difference value can be represented with a wave-like trend line 201 including wave crests 202 and 203, which marks data samples sandwiched between a set of increasing difference values and a set of decreasing difference values. Wave-like trend line 201 also include a wave "trough" 204, which marks a data sample sandwiched between a set of decreasing difference values and a set of increasing difference values. Information about a number of wave troughs (or wave crests) within a certain period of time can provide an estimation of a rate of intensity variation of the acoustic signals, where a larger number can indicate a higher rate of intensity variation.

There are various ways by which acoustic detection system 102 can determine a rate of intensity variation of the acoustic signals. As an illustrative example, acoustic detection system 102 can determine a distribution of frequency components of the acoustic signals by performing, for example, Fast Fourier Transform (FFT) on the data samples. Based on the distribution of frequency components (e.g., an aggregation of frequency components around a certain frequency band), acoustic detection system 102 can estimate a rate of intensity change of the acoustic signals. For example, if the frequency components aggregate around a certain frequency, that frequency can be related to, for example, a number of wave troughs (e.g., wave trough 204) or a number of wave crests (e.g., wave crests 202 and 203) within a certain period of time, which can provide an estimation of the rate of intensity change. If that frequency exceeds a certain threshold, acoustic detection system 102, acoustic detection system 102 can determine that the acoustic signals are indicative of potential security threat, and can determine to transmit the data samples of the acoustic signals to remote server 104 for further analysis.

In some embodiments, acoustic detection system 102 can also determine a rate of intensity variation of the acoustic signals by determining a number of times the difference values exceed or below a threshold, which can also indicate a number of crests and troughs of the acoustic signals, and a rate of intensity variation of the acoustic signals. As an illustrative example, as shown in FIG. 2, within a time duration 205, the difference values exceed a signal threshold 207 twice, which can indicate that there are two wave crests (e.g., wave crests 202 and 203) within time duration 205. Similarly, within the same time duration 205, the difference values fall below a signal threshold 208 once, which can also indicate that there is one wave trough (e.g., wave trough 204) within time duration 205. As discussed above, the number of wave troughs and crests can indicate a rate of intensity variation. Therefore, by determining a number of times the difference values are above or below a threshold, the system can also estimate a rate of intensity variation. Such a scheme typically involves fewer computation steps than FFT, and can be performed at a higher rate and/or with less computation power.

In some embodiments, acoustic detection system 102 can group a set of data samples into a plurality of data subsets to determine the rate of intensity variation of the acoustic signals. Acoustic detection system 102 can then set an analysis window that includes a number of the subsets of data samples. For each subset of data samples included in an analysis window, acoustic detection system 102 can determine a number of crests (or troughs) (e.g., by comparing the difference values against a threshold). Acoustic detection system 102 can then compare the number against a threshold number. If the number exceeds the threshold number, acoustic detection system 102 can determine that there is an indication of potential security threat, and transmit the data samples of the acoustic signals to remote server 104 for further analysis.

Figure 3:
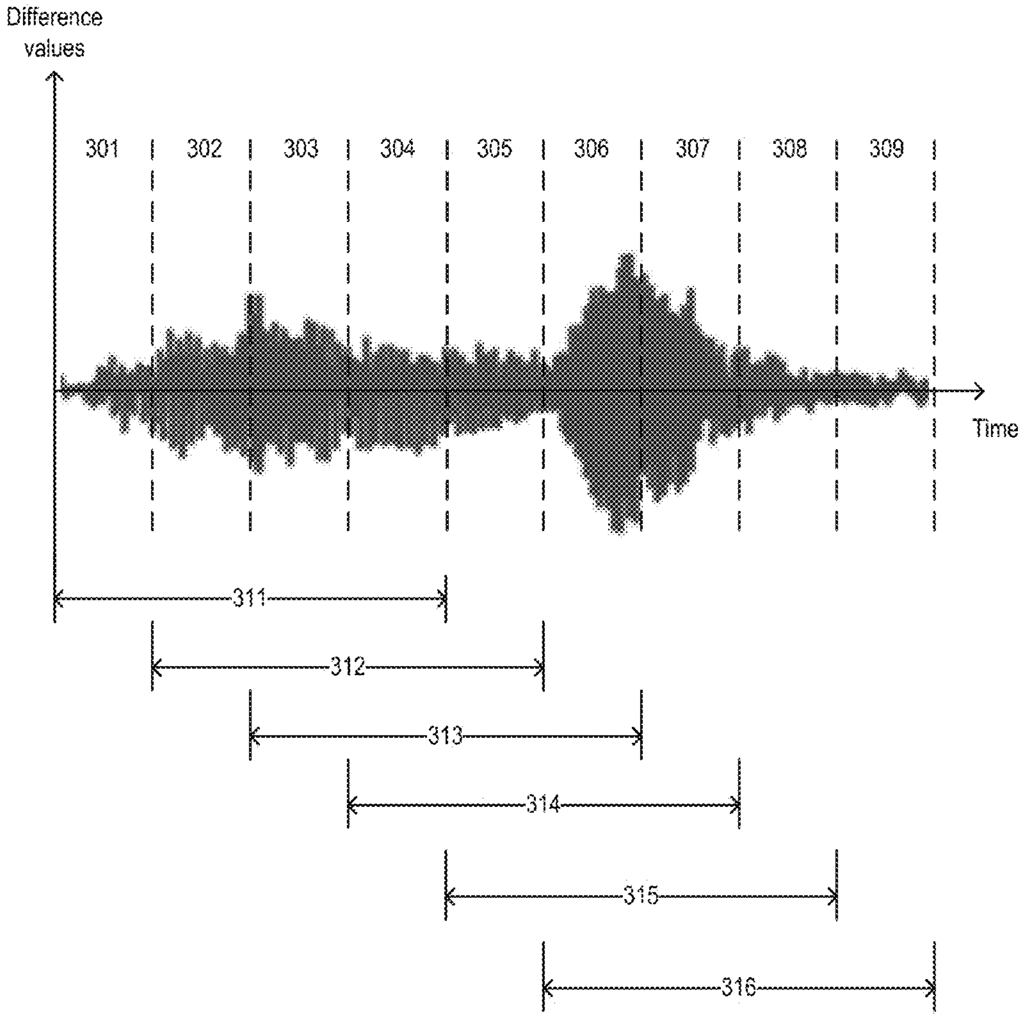

Reference is now made to FIG. 3, which illustrates an exemplary configuration of analysis windows for a set of data samples. As shown in FIG. 3, acoustic detection system 102 can group a set of data samples into subsets 301-309, with each subset including a number of consecutive data samples. In some embodiments, each subset can be associated with a fixed duration and/or include a fixed number of data samples. As an illustrative example, in a case where the sampling frequency is 16 KHz (i.e., acoustic detection system 102 can generate 16000 data samples within one second), each subset can be configured to include the samples generated within a duration of 20 milliseconds, which can be up to 320 consecutive data samples.

Subsets 301-309 can be associated by acoustic detection system 102 with analysis windows 311-316. In some embodiments, as shown in FIG. 3, each analysis window can include a number of consecutive subsets (e.g., analysis window 311 includes subsets 311, 312, 313, and 314). Although FIG. 3 shows that an analysis window includes four subsets, it is understood that an analysis window according to embodiments of the present disclosure can include more than four subsets. For example, an analysis window can include 5-50 subsets.

For each subset of data samples included in each analysis window, acoustic detection system 102 can determine a number of crests (or troughs), whether the number exceeds a certain threshold, and whether the data samples within analysis window is indicative of potential security threat. After analyzing one analysis window, acoustic detection system 102 can then repeat the same analysis for the next analysis window to process new data samples.

The analysis windows can be configured based on a sliding window approach, with neighboring analysis windows covering an overlapping set of subsets. For example, as shown in FIG. 3, analysis window 312, which is configured to be adjacent to analysis window 311 in time, includes subsets 312, 313, 314, and 315. As a result, analysis windows 311 and 312 both include subsets 312, 313, and 314. With a sliding window approach, the determination for rate of variation of the intensity of the acoustic signal can become less susceptible to noise disturbance, which tends to occur within a very short duration, and does not produce a repeating pattern of intensity variation across a number of analysis windows. As a result, the determination of an indication of potential security threat can become more accurate.

Figure 4:
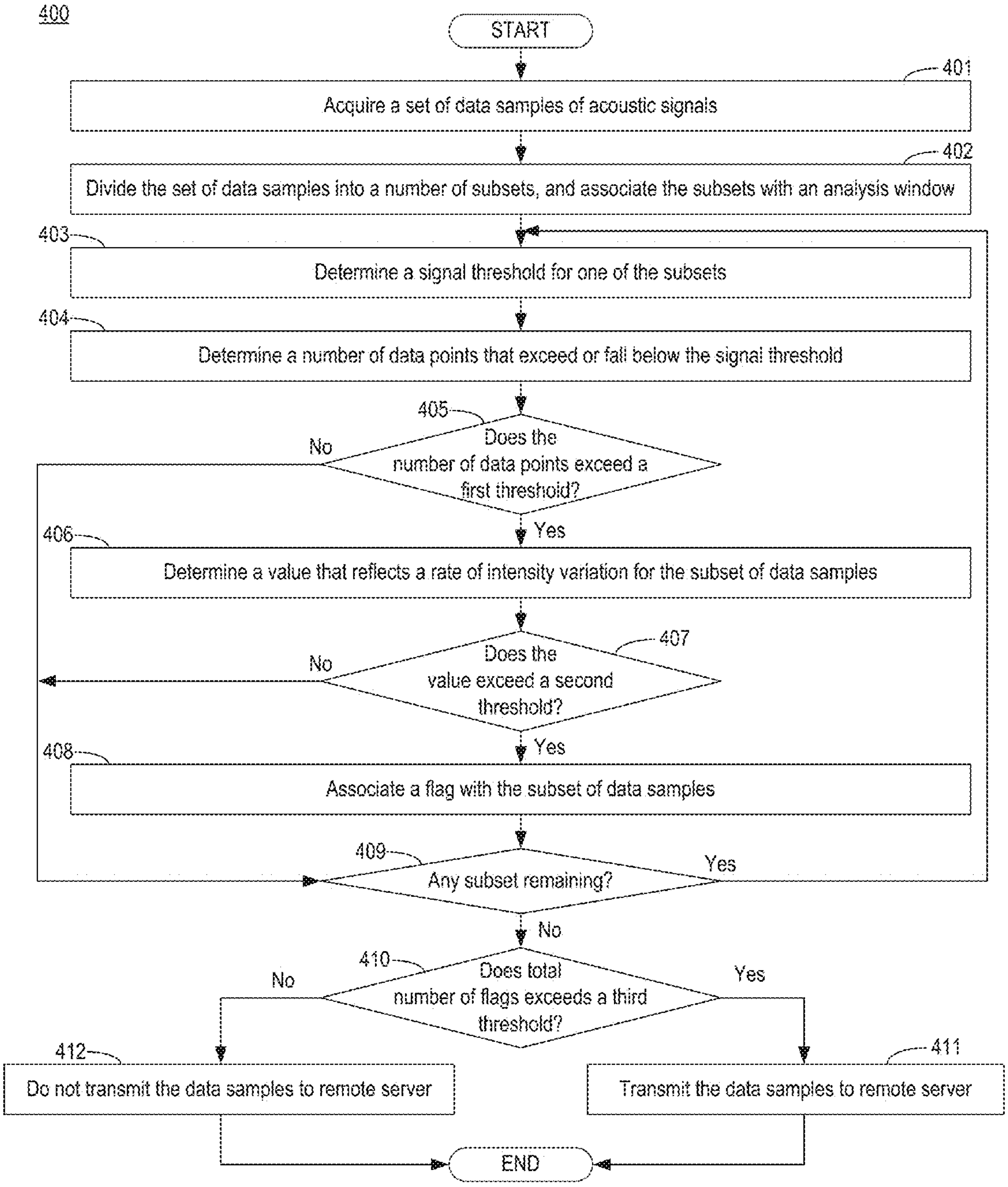
FIG. 4 is a flowchart of an exemplary method for hierarchical acoustic detection of security threats, consistent with disclosed embodiments.

Reference is now made to FIG. 4, which illustrates an exemplary method 400 for providing hierarchical acoustic detection of security threats, consistent with disclosed embodiments. Method 400 can be performed by acoustic detection system 102 to determine whether to transmit the acoustic data samples to remote server 104 for further processing.

After an initial start, the system proceeds to step 401 to acquire a set of data samples of acoustic signals, such as the samples shown in FIG. 3, from the ADC that interfaces with microphone 107.

The system can proceed to step 402 to assign sets of the data samples to different subsets, and assign the subsets to one or more analysis windows. For example, referring back to FIG. 3, the system may have acquired data samples corresponding to subsets 301, 302, 303, and 304, and associate the subsets with analysis window 311.

The system can proceed to step 403 to process one of the subsets of data samples (e.g., data samples subset 301). In step 403, the system may determine a threshold for determination of a number of crests (or troughs). For example, the system may determine a signal threshold, such as signal threshold 207 or signal threshold 208. The signal threshold can be determined based on a value of the data samples associated with a crest or a trough. As an example, to determine a signal threshold for number of crest determination, the system may determine a maximum value of the data samples within the subset that is being processed. The system may determine the signal threshold by scaling the maximum value with a scaling factor between, for example, 0.5-0.95. As another example, to determine a signal threshold for number of trough determination, the system may also determine a minimum value of the data samples within the subset that is being processed, and scale the minimum value with the scaling factor.

In some embodiments, the signal threshold can also be determined based on a running average including prior maximum and/or minimum values determined from previously-processed data samples. The running average can be done in a weighted fashion, with larger weights given to the data samples of the subset being processed, and lower weights given to previously-processed data samples.

After determining the signal threshold in step 403, the system may proceed to step 404 to determine a number of crests (or troughs) in the subset of data samples based on the signal threshold. For example, to determine a number of crests, the system may determine, in step 404, a number of data samples of which the values exceed the signal threshold. Also, to determine a number of troughs, the system may determine, in step 404, a number of data samples of which the values fall below the signal threshold.

After determining a number of data samples of which the values exceed (or fall below) the signal threshold in step 404, the system may proceed to step 405 to determine whether that number exceeds a first threshold. If that number exceeds the first threshold, which may indicate the intensity of the acoustic signals changes at a rapid rate, the system may proceed to step 406 to determine a value that reflects a rate of intensity variation for the subset of data samples. In some embodiments, the first threshold can be set based on the sampling frequency and the number of data samples in a subset, and may be set at a value between 1 and 80.

In some embodiments, the system can determine the value that reflects a rate of intensity variation for the subset of data samples based on, for example, a number of crests (or troughs) included in the data sample subset, and a period of time associated with the data sample subset. As an illustrative example, the rate of intensity variation can be determined as follows:

$$\text{Rate of intensity} = \frac{\begin{array}{c}\text{number of data samples}\\ \text{exceeding (or below) the first threshold}\end{array}}{\text{Period of time associated with the data samples}}$$

After determining the value that reflects a rate of intensity variation, in step 406, the system may proceed to step 407 to determine whether that value exceeds a second threshold, which may indicate that the acoustic signals exhibit the kind of rapid intensity variation that is indicative of a potential security threat. If the value exceeds the second threshold, the system may proceed to step 408 to associate a flag with the subset of data samples. In some embodiments, the second threshold can be set based on the sampling frequency and the number of data samples in a subset, and may be set at a value between 30 and 50.

On the other hand, if the number of data samples of which the magnitudes exceed (or fall below) does not exceed the first threshold, as determined in step 405, or that the value that reflects a rate of intensity variation does not exceed the second threshold, as determined in step 407, the system may proceed to step 409 to determine whether there are other subsets of data samples (associated with the analysis window) to be processed. If there are other subsets of data samples to be processed, the system may proceed to step 403 to process the next subset of data samples.

If the system determines that all the subsets of data samples have been processed, as determined in step 409, the system may proceed to step 410 to determine whether a total number of flags set in step 408 for the analysis window exceeds a third threshold. If the total number of flags set in step 408 exceeds the third threshold, the system may determine that the data samples associated with the analysis window are indicative of potential security threshold, and that these data samples are to be transmitted to remote server 104 for further processing to detect security threats, in step 411. On the other hand, if the number of subsets does not exceed the third threshold, the system may determine that the data samples associated with the analysis window are not indicative of potential security threshold, and that these data samples will not be transmitted to remote server 104, in step 412. The system may then proceed to process the subsets of data samples associated with the next analysis window.

On the other hand, if the number of data samples of which the magnitudes exceed (or fall below) the current threshold does not exceed the second threshold, the system may proceed to step 407 to determine whether all of the subsets of data samples of the current analysis window has been processed. If the system determines that there are other subsets of data samples to be processed, in step 407, the system may proceed back to step 403 to process the next subset of data samples.

In some embodiments (not shown in FIG. 4), the system may determine whether to transmit the data samples to remote server 104 based on the analysis results of multiple analysis windows. As an illustrative example, referring back to FIG. 3, if the total number of flags exceeds the third threshold for analysis window 311, but not for analysis windows 312, 313, and 314, the system may determine that the analysis result of analysis window 311 can be an “outlier” not indicative of the actual conditions under observation (e.g., due to disturbance of noise). In this case, the system may still determine not to transmit the data samples to remote server 104 for further analysis.

Figure 5:
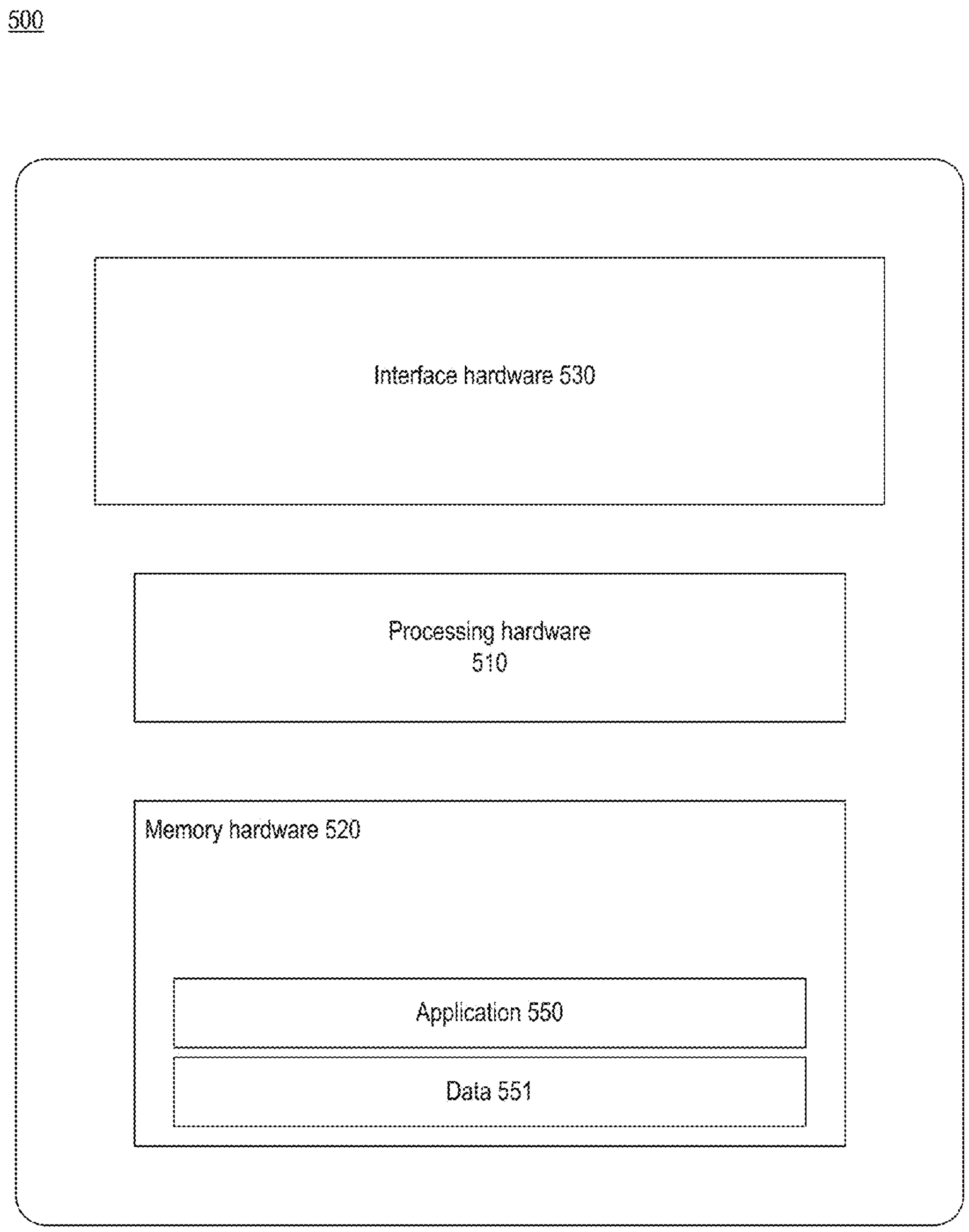
FIG. 5 is a block diagram of an exemplary system for providing hierarchical acoustic detection of security threats, consistent with disclosed embodiments.

Reference is now made to FIG. 5, which depicts an exemplary system 500, which can be configured as acoustic detection system 102, remote server 104, or mobile device 106. System 500 may include processing hardware 510, memory hardware 520, and interface hardware 530.

Processing hardware 210 may include one or more known processing devices, such as a general purpose microprocessor, a microcontroller, etc. that are programmable to execute a set of instructions. Memory hardware 520 may include one or more storage devices configured to store instructions used by processor 510 to perform functions related to disclosed embodiments. For example, memory hardware 520 may be configured with one or more software instructions, such application 550 that may perform one or more operations when executed by processing hardware 510. The disclosed embodiments are not limited to separate programs or computers configured to perform dedicated tasks. Memory hardware 520 may also store data 551 that the system may use to perform operations consistent with disclosed embodiments.

Interface hardware 530 may include interfaces to I/O devices, as well as network interfaces and interfaces to other sensing hardware, such as microphone 107. For example, the I/O devices may include output devices such as a display, a speaker, etc., while input devices may include a camera unit, hardware buttons, touch screen, etc. The I/O devices may also include an ADC configured to sample the acoustic signals received by microphone 107 to generate data samples. Network interfaces may include wireless connection interface under various protocols (e.g., Wi-Fi, Bluetooth®, cellular connection, etc.), wired connection (e.g., Ethernet), etc. The network interface of interface hardware 530 enables system 500 to interact with other devices (e.g., acoustic detection system 102, remote server 104, or mobile device 106, etc.), with the I/O interface of interface hardware 530 enables system 500 to interact with a user. For example, with interface hardware 530, mobile device 106 can display a warning message based on a signal received from remote server 104 that indicates a security threat.

System 500 may be configured to execute software instructions of application 550. Application 550 may include one or more software modules configured to provide various functionalities described in this disclosure. For example, application 550 may include a mobile app which, when executed by processing hardware 510, may cause system 500 to display a graphical user interface for displaying information to a user, such as the aforementioned warning message. Application 550 may also include acoustic signal processing module 154 of FIG. 1 and be configured to process the digitized samples, to determine a rate of intensity variation of the acoustic signals. Application 550 may include software instructions that, when executed by processing hardware 510, perform the schemes of rate-of-intensity variation determination discussed above with respect to FIGS. 2, 3, and 4. For example, application 550 may include a set of computation steps for performing FFT on the data samples. Application 550 may also include a set of computation steps to determine a number of wave crests and/or troughs from the data samples, and to determine a rate of intensity variation based on the number.

Computer programs created on the basis of the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for detecting a security threat over a network, the system comprising:

a microphone configured to capture acoustic signals;

a hardware interface configured to generate data samples from the acoustic signals;

a memory storing a plurality of instructions; and a hardware processor configured to execute the instructions to:

determine a rate of intensity variation of the acoustic signals;

determine, based on the rate of intensity variation of the acoustic signals, whether to transmit the data samples to a remote server;

after determining to transmit the data samples to the remote server:

generate data packets that include the data samples; and transmit the data packets to the remote server;

wherein the determination of the rate of intensity variation of the acoustic signals comprises:

grouping the data samples into a plurality of data subsets;

determining a first number for each data subset of the plurality of data subsets, the first number corresponding to a number of data samples, in each data subset, of which a value exceeds or falls below a first threshold; and determining a second number as the number of data subsets of which the first number exceeds the first threshold; and wherein the determination of whether to transmit the data samples to the remote server for detection of security threat comprises determining to transmit the data samples to the remote server if the second number exceeds a second threshold.

2. The system of claim 1, wherein the determination of the rate of intensity variation of the acoustic signals comprises:

grouping the plurality of data subsets into a plurality of analysis windows, at least two of the analysis windows including a number of identical data subsets;

wherein the second number is determined based on data subsets grouped into one analysis window.

3. The system of claim 2, wherein:

the determination of the rate of intensity variation of the acoustic signals comprises determining the second number for each of the analysis windows; and the determination of whether to transmit the data samples to the remote server is based on a distribution of the second numbers among the analysis windows.

4. The system of claim 1, wherein:

the system further comprises the remote server; and the remote server is configured to:

receive the data packets;

reconstruct the data samples from the data packets;

compare the data samples against one or more known patterns of acoustic signals associated with a security threat;

generate a signal based on the comparison result; and transmit the signal to a monitoring device to cause the monitor device to generate a warning based on the signal.

5. The system of claim 4, comprising a support vector machine configured to categorize the one or more known patterns of acoustic signals.

6. A method for detecting a security threat over a network, comprising:

receiving acoustic signals;

generating data samples from the acoustic signals;

determining a rate of intensity variation of the acoustic signals;

determining, based on the rate of intensity variation of the acoustic signals, whether to transmit the data samples to a remote server;

after determining to transmit the data samples to the remote server:

generating data packets that include the data samples; and transmitting the data packets to the remote server;

wherein the determination of the rate of intensity variation of the acoustic signals comprises:

grouping the data samples into a plurality of data subsets;

determining a first number for each data subset of the plurality of data subsets, the first number corresponding to a number of data samples, in each data subset, of which a value exceeds or falls below a first threshold; and determining a second number as the number of data subsets of which the first number exceeds the first threshold; and wherein the determination of whether to transmit the data samples to the remote server for detection of security threat comprises determining to transmit the data samples to the remote server if the second number exceeds a second threshold.

7. The method of claim 6, wherein the determination of the rate of intensity variation of the acoustic signals comprises:

grouping the plurality of data subsets into a plurality of analysis windows, at least two of the analysis windows including a number of identical data subsets;

wherein the second number is determined based on data subsets grouped into one analysis window.

8. The method of claim 7, wherein:

the determination of the rate of intensity variation of the acoustic signals comprises determining the second number for each of the analysis windows; and the determination of whether to transmit the data samples to the remote server is based on a distribution of the second numbers among the analysis windows.

9. The method of claim 6, further comprising:

receiving, by the remote server, the data packets;

reconstructing, by the remote server, the data samples from the data packets;

comparing, by the remote server, the data samples against one or more known patterns of acoustic signals associated with a security threat;

generating, by the remote server, a signal based on the comparison result; and transmitting, by the remote server, the signal to a monitoring device to cause the monitor device to generate a warning based on the signal.

10. The method of claim 9, further comprising: categorizing the one or more known patterns of acoustic signals.

11. A non-transitory computer readable medium that stores a set of instructions that is executable by a hardware processor to cause the hardware processor to perform a method for detecting a security threat over a network, comprising:

receiving acoustic signals;

generating data samples from the acoustic signals;

determining a rate of intensity variation of the acoustic signals;

determining, based on the rate of intensity variation of the acoustic signals, whether to transmit the data samples to a remote server;

after determining to transmit the data samples to the remote server:

generating data packets that include the data samples; and transmitting the data packets to the remote server;

wherein the determination of the rate of intensity variation of the acoustic signals comprises:

grouping the data samples into a plurality of data subsets;

determining a first number for each data subset of the plurality of data subsets, the first number corresponding to a number of data samples, in each data subset, of which a value exceeds or falls below a first threshold; and determining a second number as the number of data subsets of which the first number exceeds the first threshold; and wherein the determination of whether to transmit the data samples to the remote server for detection of security threat comprises determining to transmit the data samples to the remote server if the second number exceeds a second threshold.

12. The medium of claim 11, wherein the determination of the rate of intensity variation of the acoustic signals comprises:

grouping the plurality of data subsets into a plurality of analysis windows, at least two of the analysis windows including a number of identical data subsets;

wherein the second number is determined based on data subsets grouped into one analysis window.

13. The medium of claim 12, wherein:

the determination of the rate of intensity variation of the acoustic signals comprises determining the second number for each of the analysis windows; and the determination of whether to transmit the data samples to the remote server is based on a distribution of the second numbers among the analysis windows.

* * * * *